(12) United States Patent
Hirose

(10) Patent No.: US 8,705,193 B2
(45) Date of Patent: Apr. 22, 2014

(54) MAGNETIC DISK CONTROL DEVICE, MAGNETIC DISK APPARATUS, MAGNETIC DISK CONTROL METHOD AND COMPUTER PROGRAM

(71) Applicant: NEC Corporation, Tokyo (JP)

(72) Inventor: Katsuhiko Hirose, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/785,072

(22) Filed: Mar. 5, 2013

(65) Prior Publication Data

US 2013/0235486 A1   Sep. 12, 2013

(30) Foreign Application Priority Data

Mar. 7, 2012 (JP) ................. 2012-050645

(51) Int. Cl.
*G11B 5/02* (2006.01)

(52) U.S. Cl.
USPC .............. 360/55; 360/60; 360/39; 360/53

(58) Field of Classification Search
None
See application file for complete search history.

(56) References Cited

U.S. PATENT DOCUMENTS

| | | | | |
|---|---|---|---|---|
| 7,170,700 | B1 * | 1/2007 | Lin et al. | 360/31 |
| 8,429,372 | B2 * | 4/2013 | Yamamoto et al. | 711/170 |
| 2011/0075291 | A1 * | 3/2011 | Cho | 360/75 |

FOREIGN PATENT DOCUMENTS

| | | |
|---|---|---|
| JP | S6381662 A | 4/1988 |
| JP | 2008-27499 A | 2/2008 |
| JP | 2008257782 A | 10/2008 |
| JP | 2010-27134 A | 2/2010 |
| JP | 2010-152987 A | 7/2010 |

OTHER PUBLICATIONS

Japanese Office Action for JP Application No. 2012-050645 mailed on Feb. 4, 2014 with English Translation.

* cited by examiner

*Primary Examiner* — Muhammad N Edun
(74) *Attorney, Agent, or Firm* — Sughrue Mion, PLLC

(57) ABSTRACT

A magnetic disk control device according to an exemplary of the invention includes a write controller to control, in a magnetic disk having tracks, the track being a storage area made by concentrically dividing a magnetic recording layer formed onto a disk into a plurality of areas, the track being divided into a plurality of areas in a rotative direction as sectors, writing information into the each sector; and a substitution controller to make, by detecting the sector or the track written at a frequency higher than a writing frequency based on a number of times of writing by the write controller to the sector or the track and by moving information recorded in an adjacent track adjacent to a high-writing-frequency track including the detected high writing frequency sector or to a high-writing-frequency track which is detected as a high writing frequency track to a track of a substitution area.

12 Claims, 4 Drawing Sheets

MAGNETIC DISK CONTROL DEVICE, MAGNETIC DISK APPARATUS, MAGNETIC DISK CONTROL METHOD AND COMPUTER PROGRAM

This application is based upon and claims the benefit of priority from Japanese Patent Application No. 2012-050645, filed on Mar. 7, 2012, the disclosure of which is incorporated herein in its entirety by reference.

TECHNICAL FIELD

The present invention relates to a magnetic disk control device which controls write, read and the like of information (data) to/from a magnetic disk. The present invention also relates to a magnetic disk apparatus equipped with the magnetic disk control device, a magnetic disk control method and a computer program.

BACKGROUND ART

A magnetic disk has a disk (platter), and a magnetic recording layer is formed on the disk. As shown in FIG. 5A, a magnetic recording layer 55 is divided into a plurality of pieces of concentric storage area 56. Each storage area 56 is called a track. This track 56 is further divided into a plurality of pieces in the direction of rotation. Such divided region 57 is called a sector.

By using magnetism which occurs from a head 58 shown in FIG. 5B, information is written in the magnetic recording layer 55 of such magnetic disk. Also, by the head 58, information is read from the magnetic recording layer 55.

Meanwhile, in a magnetic disk, there is a tendency of increasingly higher track density (TPI (Track per Inch)) in which the track 56 becomes narrower in response to the demand of miniaturization and higher memory capacity. For this reason, when information is written in a sector 57 (track 56) by using magnetism from the head 58, a leakage flux from the head 58 tends to easily affect a track 56 (adjacent track) adjacent to the track 56 of the writing target. Specifically, when information is written into a certain track 56 a plurality of times, there occurs a phenomenon in which information stored (recorded) in an adjacent track 56 adjacent to that track 56 is demagnetized or degaussed, that is, adjacent track interference (Adjacent Track Interference (ATI)).

In order to prevent a situation in which information (data) recorded in an adjacent track is destroyed by this Adjacent Track Interference (ATI) (data corruption problem), there is a case where a refreshment operation is carried out to the adjacent track. A refreshment operation is an operation in which information recorded in a track is read once, and, in addition, the read information is written in the same track again.

In order to prevent the data corruption problem by Adjacent Track Interference (ATI), Japanese Patent Application Laid-Open No. 2008-257782 discloses the following method. That is, a magnetic disk apparatus indicated in this document monitors the number of times of writing in each sector in a magnetic disk. When it is detected that the number of times of writing in a sector exceeds a prescribed threshold value, the magnetic disk apparatus replaces the address corresponding to the sector with an address corresponding to another sector. By this, because a sector corresponding to the address of a large writing frequency is changed, phenomena where information is further written into a sector with a large writing frequency can be reduced. As a result, the magnetic disk apparatus can prevent information which is recorded in an adjacent track neighboring a sector with a large writing frequency from being damaged due to Adjacent Track Interference (ATI).

Japanese Patent Application Laid-Open No. 1988-81662 discloses a method to handle a problem caused by a bad track (bad sector) in which information cannot be written normally any more due to repeated writing.

In order to prevent the data corruption problem caused by Adjacent Track Interference (ATI), there is a case where a refreshment operation is carried out to a track being in danger of data corruption as described above. In this case, when a writing frequency in a track next to a track (in this description, it is supposed to be a track R) of a refreshment operation target is high, a refreshment operation is carried out repeatedly to the track R. Repeatedly carried out refreshment operation could lead to making the time needed for reading and writing information (data) from/to a magnetic disk long. In other words, a refreshment operation has a risk to deteriorate the performance of a magnetic disk apparatus equipped with a magnetic disk.

SUMMARY

An exemplary object of the present invention is to provide a magnetic disk control device, a magnetic disk apparatus and a magnetic disk control method which can prevent the data corruption problem caused by Adjacent Track Interference (ATI) without deteriorating the device performance.

A magnetic disk control device according to an exemplary aspect of the invention includes a write controller to control, in a magnetic disk having tracks, the each track being a storage area made by concentrically dividing a magnetic recording layer formed onto a disk into a plurality of areas, the each track being further divided into a plurality of areas in a rotative direction as sectors, writing information into the each sector; and a substitution controller to make, by detecting the sector or the track written at a frequency higher than a prescribed writing frequency based on a number of times of writing by the write controller to the sector or the track per prescribed unit time and by moving information recorded in an adjacent track adjacent to a high-writing-frequency track including the detected high writing frequency sector or to a high-writing-frequency track which is detected as a high writing frequency track to a track of a substitution area set in advance, the adjacent track be in an idle status, the idle status being a status of not being used.

A magnetic disk apparatus according to an exemplary aspect of the invention includes a magnetic disk having tracks, the each track being a storage area made by concentrically dividing a magnetic recording layer formed onto a disk into a plurality of areas, the each track being further divided into a plurality of areas in a rotative direction as sectors; and a magnetic disk control device that includes a write controller to control writing information into the each sector in the magnetic disk and a substitution controller to make, by detecting the sector or the track written at a frequency higher than a prescribed writing frequency based on a number of times of writing by the write controller to the sector or the track per prescribed unit time, and by moving information recorded in an adjacent track adjacent to a high-writing-frequency track including the detected high writing frequency sector or to a high-writing-frequency track which is detected as a high writing frequency track to a track of a substitution area set in advance, the adjacent track be in an idle status, the idle status being a status of not being used.

A magnetic disk control method according to an exemplary aspect of the invention includes detecting, in a magnetic disk having tracks, the each track being a storage area made by concentrically dividing a magnetic recording layer formed onto a disk into a plurality of areas, the each track being further divided into a plurality of areas in a rotative direction as sectors, the sector or the track written at a frequency higher than a prescribed writing frequency based on a number of times of writing by the write controller to the sector or the track per prescribed unit time; and moving information recorded in an adjacent track adjacent to a high-writing-frequency track including the detected high writing frequency sector or a high-writing-frequency track which is detected as a high writing frequency track to a track of a substitution area set in advance, making the adjacent track be in an idle status, the idle status being a status of not being used.

According to the present invention, the data corruption problem caused by Adjacent Track Interference (ATI) can be prevented without deteriorating the device performance.

BRIEF DESCRIPTION OF THE DRAWINGS

Exemplary features and advantages of the present invention will become apparent from the following detailed description when taken with the accompanying drawings in which.

EXEMPLARY EMBODIMENT

An exemplary embodiment according to the present invention will be described with reference to a drawing below.

First Embodiment

Figure 1:
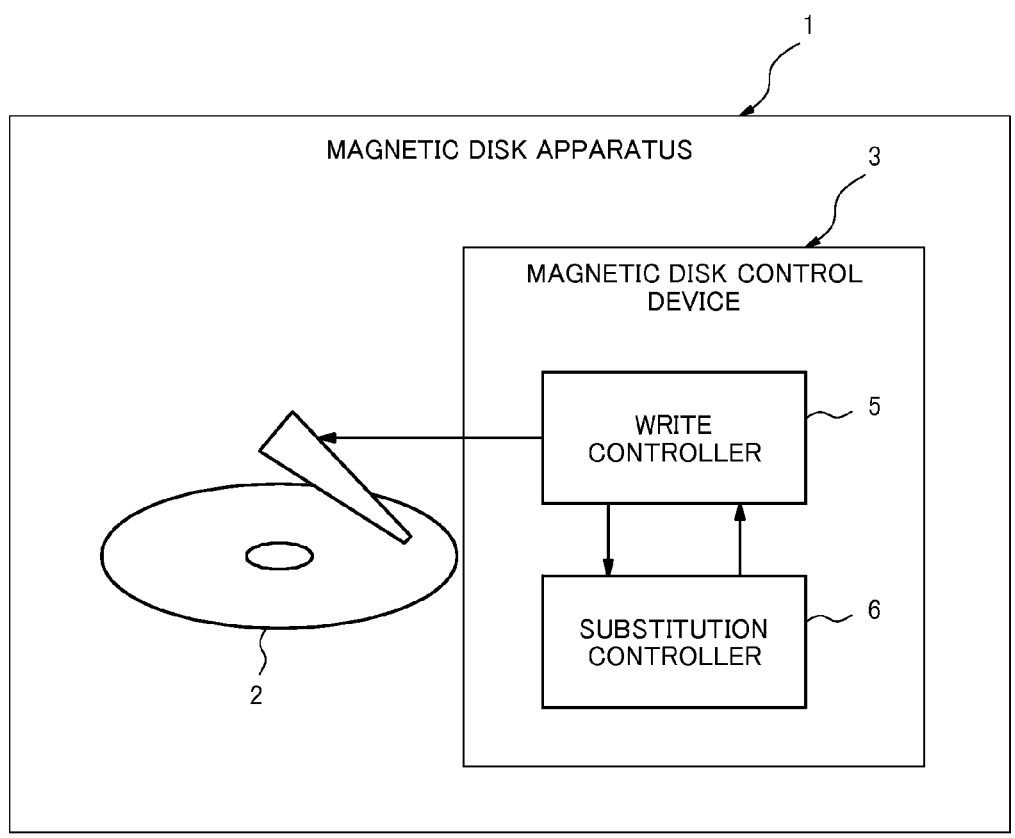
FIG. 1 is a diagram illustrating a first exemplary embodiment according to the present invention.

FIG. 1 is a diagram which shows a structure of a magnetic disk control device of the first exemplary embodiment according to the present invention and a magnetic disk apparatus equipped with the same in a simplified manner. A magnetic disk apparatus 1 of the first exemplary embodiment has a magnetic disk 2 and a magnetic disk control device 3. The magnetic disk 2 has a disk, and a magnetic recording layer is formed onto the disk. This magnetic recording layer is divided into a plurality of tracks which are concentric storage areas. Further, each track is divided into a plurality of sectors in a rotative direction.

The magnetic disk control device 3 has a write controller 5 and a substitution controller 6. The write controller 5 is equipped with a function to control writing of information to the sector in the magnetic disk 2.

The substitution controller 6 has a function to detect, based on information from the write controller 5, the number of writing into the sector or track per prescribed unit time, and to judge presence or absence of the sector or track into which the writing at a higher frequency than a prescribed writing frequency. The substitution controller 6 is further equipped with a function to move information recorded in an adjacent track neighboring to a high-writing-frequency track which includes the sector which is detected as a high writing frequency sector, or a high-writing-frequency track which is detected as a high writing frequency track to a track in a substitution area set in advance.

In the first exemplary embodiment, the magnetic disk control device 3 is equipped with a function to move, when a high-writing-frequency track is detected as mentioned above, information recorded in an adjacent track neighboring the high-writing-frequency track to a substitution area. By this function, the above-mentioned adjacent track becomes an idle status track that is not used. For this reason, even if leakage flux of a head which writes information into a high-writing-frequency track extends to an adjacent track, the data corruption problem caused by Adjacent Track Interference (ATI) can be prevented.

Also, because an adjacent track neighboring a high-writing-frequency track becomes an idle status as mentioned above, the magnetic disk control device 3 does not need to perform a refreshment operation to the adjacent track repeatedly. By reduction of refreshment operations, the magnetic disk control device 3 can prevent a problem that a time required for reading or writing information (data) becomes long due to a refreshment operation.

That is, the magnetic disk control device 3 can prevent a data corruption problem caused by Adjacent Track Interference without causing performance deterioration.

The magnetic disk apparatus 1 equipped with the above-mentioned magnetic disk control device 3 can improve reliability of data storing because the magnetic disk apparatus 1 suppresses a data corruption problem caused by Adjacent Track Interference (ATI) without deteriorating the performance.

Second Embodiment

The second exemplary embodiment according to the present invention will be described below.

Figure 2:
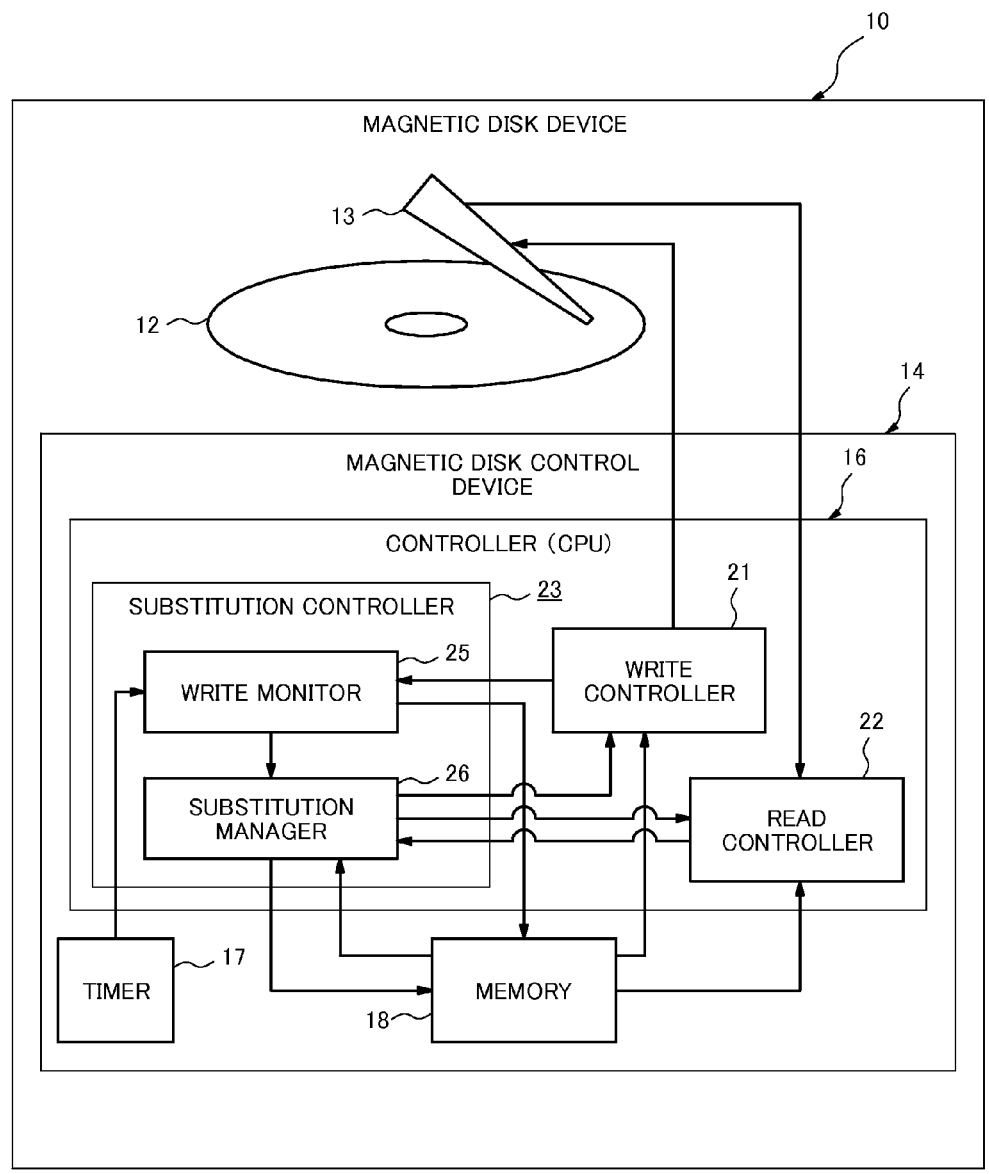
FIG. 2 is a diagram which shows a structure of a magnetic disk control device of a second exemplary embodiment according to the present invention and a magnetic disk device equipped with the same in a simplified manner.

FIG. 2 is a diagram which shows a magnetic disk device 10 of the second exemplary embodiment according to the present invention in a simplified manner. The magnetic disk device 10 of the second exemplary embodiment has a magnetic disk 12, a magnetic head 13 and a magnetic disk control device 14.

The magnetic disk 12 has the same structure as the magnetic disk 2 described in the first exemplary embodiment. In other words, the magnetic disk 12 has a disk, and a magnetic recording layer is formed onto the disk. This magnetic recording layer is divided into tracks which are a plurality of concentric storage areas. Each track is further divided into a plurality of portions in the direction of rotation as sectors.

Figure 3:
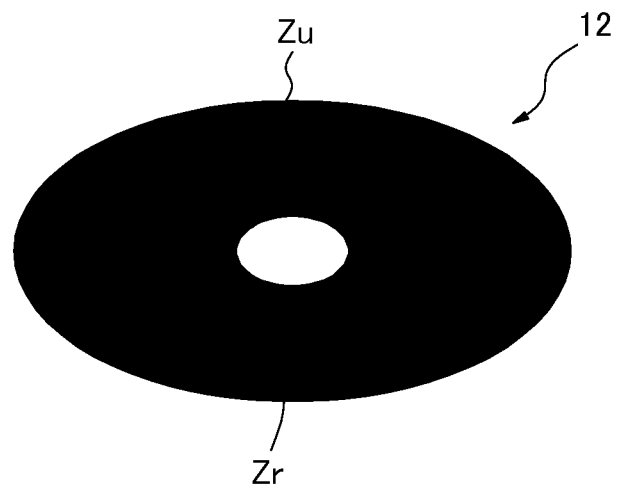
FIG. 3 is a diagram showing an example of a substitution area of a magnetic disk in the second exemplary embodiment.

According to the second exemplary embodiment, in the magnetic recording layer in the magnetic disk 12, a track region Zu for ordinary use and a track region Zr as a substitution area (reserved area) are set as shown in the model diagram of FIG. 3. As the track region Zr that is the substitution area, at least two tracks are set in the most inner circumference side (the side where the data transfer rate becomes slow), for example. Meanwhile, for example, in the case of a multizone format specification, it is desirable that six tracks or more are set. Therefore, in the second exemplary embodiment, it is supposed that six tracks or more are set as the substitution area Zr.

The magnetic head 13 has a structure which realizes a function to write information in the magnetic disk 12 using magnetism and a function to read information from the magnetic disk 12 using magnetism.

Meanwhile, the magnetic disk device 10 further has a driving unit which rotates the magnetic disk 12 and moving unit which moves the magnetic head 13. However, in this embodiment, detailed description and illustration of those are omitted.

The magnetic disk control device (controller) 14 controls overall operations of the magnetic disk device 10. The magnetic disk control device 14 has a controller 16, a timer 17 and a memory 18. The timer 17 is equipped with a function to output clock time information. The memory 18 is equipped with a function to store a computer program (program) which indicates control procedures carried out by the controller 16 and various data.

The memory 18 stores address management data. Address management data is data which indicates association between an address which is included in a write request (write command) or a read request (read command) given to the magnetic disk device 10 (the magnetic disk control device 14) from outside and location information of a sector in the magnetic disk 12.

For example, the controller 16 includes a CPU (Central Processing Unit). The controller 16 is equipped with a function to control overall operations of the magnetic disk device 10 by executing a computer program stored in the memory 18. According to the second exemplary embodiment, the controller 16 has a write controller 21, a read controller 22 and a substitution controller 23 as functional units.

In order to write writing-target information (data) which is included in a write request (write command) given from outside into a writing-target sector in the magnetic disk 12, the write controller 21 has the following functions. That is, the write controller 21 has a function to write writing-target information into a writing-target sector by controlling the magnetic head 13 and the like based on an address included in the write request and address management data stored in the memory 18. Further, the write controller 21 also has a function to write information into the magnetic disk 12 like the above based on an order from the substitution controller 23.

In order to read information (data) from a sector of the magnetic disk 12 corresponding to an address included in a read request (read command) given from outside, the read controller 22 has the following functions. That is, the read controller 22 has a function to control the magnetic head 13 and the like and to read desired information from the magnetic disk 12 based on an address included in the read request and the address management data of the memory 18. Further, the read controller 22 also has a function to read information from the magnetic disk 12 based on a command from the substitution controller 23 similarly to the above.

The substitution controller 23 has a write monitor 25 and a substitution manager 26. The write monitor 25 has a function to identify, when a write request is given to the write controller 21, the position of a sector of a writing target in the magnetic disk 12 based on an address included in the write request and address management data stored in the memory 18.

Also, the write monitor 25 has a function to acquire clock time information from the timer 17 when detecting information is written in the sector as mentioned above. Further, the write monitor 25 has a function to generate data which correlates the acquired clock time information and location information of the sector of the above-mentioned writing target, and add the generated data to write history data stored in the memory 18.

The substitution manager 26 is equipped with a function to extract the following sector from write history data stored in the memory 18 at prescribed timing. Such sector is a sector where the number of writing per prescribed unit time (per the nearest one week, for example) (in other words, a writing frequency) is higher than the number of writing (a writing frequency (1000 times/week, for example)) that has been prescribed. For example, timing when such sector is extracted may be every prescribed time interval or may be every time when information is written in a sector.

Figure 4:
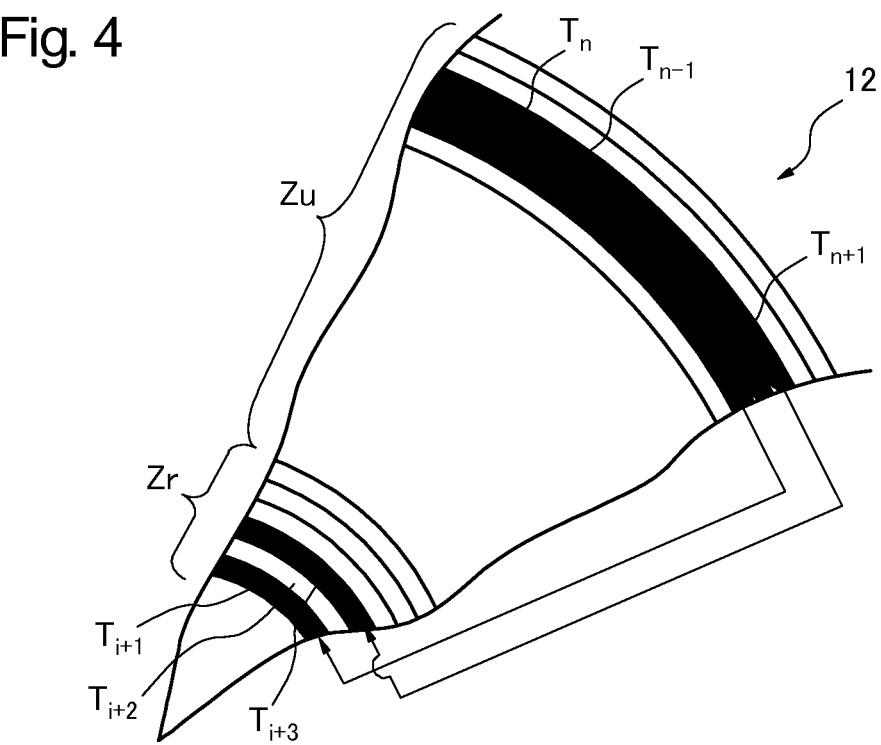
FIG. 4 is a model diagram illustrating an example of a substitution operation in the second exemplary embodiment.
Figure 5A:
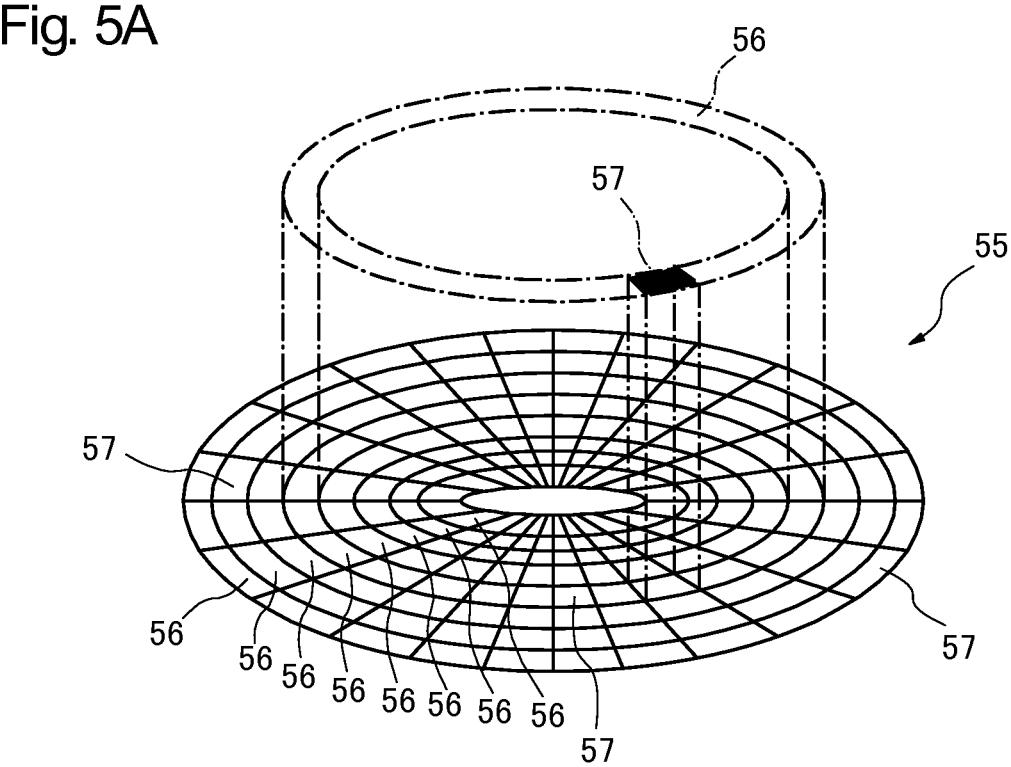
FIG. 5A is a model diagram illustrating an exemplary configuration of a magnetic disk.
Figure 5B:
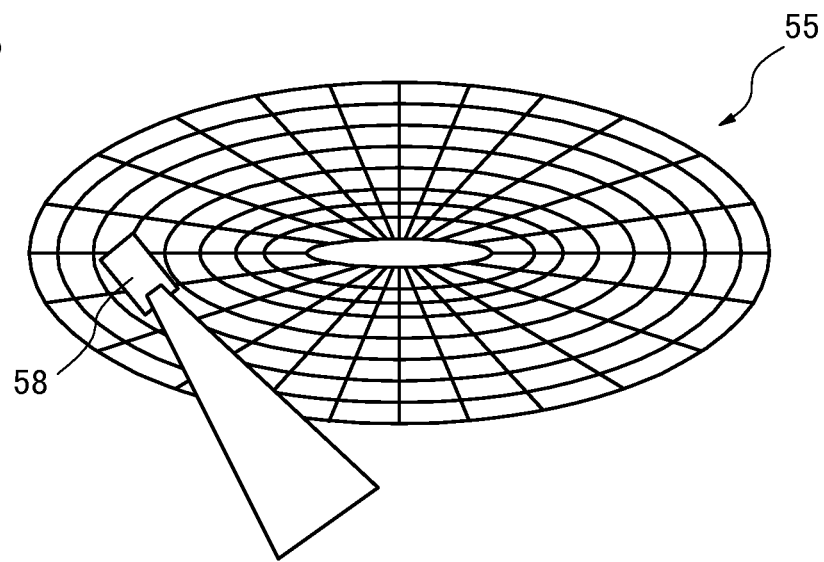
FIG. 5B is a model diagram illustrating an exemplary configuration of a magnetic disk.

The substitution manager 26 is equipped with a function to identify, when the sector with a high writing frequency has been extracted, an adjacent track neighboring a track including the extracted sector (hereinafter, referred to as a high-writing-frequency track) as a track of a substitution target (a target of move). FIG. 4 is a diagram indicating part of the magnetic disk 12 schematically. For example, when track $T_n$ shown in FIG. 4 is detected as a high-writing-frequency track, the substitution manager 26 identifies adjacent tracks $T_{n-1}$, $T_{n+1}$ in the both sides of the detected track as a track of the substitution target.

The substitution manager 26 has a function to give an order to read all information of the identified adjacent tracks $T_{n-1}$, $T_{n+1}$ to the read controller 22. Such order is given after it has been confirmed that, based on a reception status of write requests and read requests from outside (an access status), it is in a low access state where write requests and read requests are reduced, for example. Meanwhile, it is more preferred that the substitution manager 26 gives the above-mentioned order to the read controller 22 after it has been confirmed that it is in a low access state, and, at the same time, is in the state that an read error has not been detected.

After the read controller 22 read all information of adjacent tracks $T_{n-1}$, $T_{n+1}$ based on the order from the substitution manager 26, the substitution manager 26 gives an order to write the information of the adjacent tracks $T_{n-1}$, $T_{n+1}$ into a track in the substitution area Zr to the write controller 21. The write controller 21 receives the order, and writes the information of the adjacent tracks $T_{n-1}$, $T_{n+1}$ into the track in the substitution area Zr. For example, information of the adjacent tracks $T_{n-1}$, $T_{n+1}$ is written in track $T_{i+1}$ of the most inner circumference of the substitution area Zr shown in FIG. 4 and track $T_{i+3}$ located in the outer circumferential side via track $T_{i+2}$ next to the track $T_{i+1}$.

The substitution manager 26 has a function to generate, when moving the information of the adjacent tracks $T_{n-1}$, $T_{n+1}$ to the substitution area Zr by the write controller 21 and the read controller 22 as mentioned above, substitution management data and store the substitution management data in the memory 18. Such substitution management data is data correlating location information $T_{n-1}$, $T_{n+1}$ of the adjacent tracks and location information $T_{i+1, Ti+3}$ of tracks after substitution. According to the second exemplary embodiment, the write controller 21 and the read controller 22 write and read information referring to not only address management data in the memory 18 but also the above-mentioned substitution management data.

According to the second exemplary embodiment, by a substitution control operation (move control operation) of the above-mentioned substitution controller 23, the adjacent tracks $T_{n-1}$, $T_{n+1}$ of the both sides of the high-writing-frequency track $T_n$ will be in an idle status where it is not used. For this reason, even if information is written in the high-writing-frequency track $T_n$ at a high frequency, a problem that information of the adjacent tracks $T_{n-1}$, $T_{n+1}$ is damaged due to Adjacent Track Interference (ATI) can be prevented.

Because it is possible to reduce or omit a refreshment operation to the adjacent tracks $T_{n-1}$, $T_{n+1}$, the following effect can be obtained. There is a case where a refreshment operation is carried out with higher priority than that of a write request or a read request from outside. In this case, because write or read information according to the write request or the read request from outside is carried out after a refreshment operation has finished, a waiting time for the write or read becomes long. For this reason, there is caused a problem that a time required for reading and writing information in the magnetic disk 12 becomes long due to a refreshment operation (in other words, performance deterioration is caused). In contrast, according to the second exemplary embodiment, because a refreshment operation is reduced or omitted as mentioned above, the performance deterioration problem caused by the refreshment operation can be suppressed.

Further, according to the second exemplary embodiment, the magnetic disk control device 14 and the magnetic disk device 10 equipped with the same do not move information recorded in a high-writing-frequency track to other areas in the magnetic disk 12, but instead move information recorded in adjacent tracks neighboring a high-writing-frequency track to the substitution area Zr. For this reason, devices 10 and 14 according to the second exemplary embodiment can obtain the following effect. It is envisioned that, at a time point when a high-writing-frequency track has been detected, adjacent tracks neighboring the high-writing-frequency track have begun to be affected by Adjacent Track Interference (ATI). For this reason, when moving information recorded in a high-writing-frequency track to the other areas in the magnetic disk 12, it is necessary not only to move information recorded in a high-writing-frequency track but also to perform a refreshment operation to adjacent tracks. In contrast, the devices 10 and 14 according to the second exemplary embodiment do not need to perform a refreshment operation to adjacent tracks as it has been mentioned above.

In addition, because, even information recorded in a high-writing-frequency track is moved, it is assumed that the state of a high writing frequency is continued in the destination of the move, there is concern that the data corruption problem caused by Adjacent Track Interference (ATI) occurs in adjacent tracks neighboring the track which is the destination of the move. In contrast, the devices 10 and 14 according to the second exemplary embodiment can prevent the data corruption problem caused by a high-writing-frequency track because adjacent tracks are changed into an idle status by moving information which is recorded in the adjacent tracks neighboring the high-writing-frequency track.

Meanwhile, from a view point of making the storage capacity of the magnetic disk 12 large, it is preferred that the number of tracks of the substitution area Zr is small. Considering this, the substitution manager 26 of the substitution controller 23 of the second exemplary embodiment further includes the following function.

That is, the substitution manager 26 has a function to judge whether a writing frequency (the number of times of writing per prescribed unit time) of track $T_n$ having the adjacent tracks $T_{n-1}$, $T_{n+1}$ whose information has been moved to the substitution area Zr (substitution has been performed) is reduced to a prescribed return judgment frequency (800 times/week, for example) or not. The substitution manager 26 further has a function to control the write controller 21 and the read controller 22 in order to return the information of the adjacent tracks $T_{n-1}$, $T_{n+1}$ neighboring the track $T_n$ from the substitution area Zr when detecting that a writing frequency of track $T_n$ has declined to a level less than the return judgment frequency. In addition, the substitution manager 26 also has a function to change the substitution management data of the memory 18 at the time when the information is returned to the adjacent tracks as above.

As mentioned above, by returning information to the original area from the substitution area Zr, the substitution manager 26 can generate a space track which is not being used in the substitution area Zr. Because the operation by which information is written in the adjacent tracks $T_{n-1}$, $T_{n+1}$ again is the same operation as the refreshment operation, an information corruption problem caused by Adjacent Track Interference is suppressed.

Further, the substitution manager 26 is equipped with the following function. That is, the substitution manager 26 has a function to confirm, when a high-writing-frequency track is detected, whether there is an idle status track in the substitution area Zr before giving an order to read information recorded in an adjacent track to the read controller 22. Further, the substitution manager 26 has a function to give, when judging that there is an idle status track in the substitution area Zr by its confirmation function, an order to read information recorded in an adjacent track to the read controller 22 successively. By thus giving a read order, information recorded in an adjacent track is moved to the substitution area Zr by the read controller 22 as mentioned above.

In order to write information recorded in an adjacent track adjacent to a high-writing-frequency track detected newly into the substitution area Zr when judging that there are no idle status tracks in the substitution area Zr, the substitution manager 26 has the following function. That is, the substitution manager 26 acquires information indicating a writing frequency of tracks that are tracks which have been detected as a high-writing-frequency track before and have adjacent tracks whose information having been recorded in them before remains being moved to the substitution area Zr (there exist a plurality of such tracks in the second exemplary embodiment). Then, the substitution manager 26 compares the writing frequencies of those tracks, and moves information to be recorded in the adjacent tracks adjacent to a track of the lowest writing frequency from the substitution area Zr to the adjacent tracks. As a result, idle status tracks are generated in the substitution area Zr. In order to move information recorded in the adjacent tracks adjacent to a track detected as a high-writing-frequency track newly to the tracks which have become an idle status, the substitution manager 26 controls the write controller 21 and the read controller 22.

According to the second exemplary embodiment, the substitution manager 26 is equipped with a function to manage the substitution area Zr, too, as mentioned above. Therefore, even if the substitution area Zr has only the small number of tracks, the substitution manager 26 can move information which is recorded in the adjacent tracks neighboring a high-writing-frequency track detected one after another. As a result, the magnetic disk control device 14 according to the second exemplary embodiment and the magnetic disk device 10 equipped with the same can prevent a data corruption problem caused by Adjacent Track Interference without severely deteriorating the large storage capacity nature of the magnetic disk 12.

The present invention is not limited to the first or the second exemplary embodiment and is applicable to various exemplary embodiments. For example, although, in the second exemplary embodiment, the substitution area Zr is set to the most inner circumference side of the magnetic disk 12, the substitution area Zr may be set to other areas in the magnetic disk 12.

In the second exemplary embodiment, the write monitor 25 is equipped with a function to watch writing into a sector in the magnetic disk 12. In contrast, the write monitor 25 may be equipped with a function to watch writing into a track in the magnetic disk 12. In this case, for example, when a write request is given to the write controller 21, the write monitor 25 identifies a track of the magnetic disk 12 into which information (data) is written based on an address included in a write request and address management data of the memory 18. Then, the write monitor 25 generates data which correlates clock time information acquired from the timer 17 and location information on a track where information is written in, and adds the data to the write history data of the memory 18.

Thus, in the case where writing into a track is monitored, the substitution manager 26 extracts a track of a high writing frequency as a high-writing-frequency track from write history data of the memory 18. The high-writing-frequency track is a track where the number of times of write per unit time (the nearest one week, for example) that has been prescribed (that is, a writing frequency) exceeds the number of times that has been prescribed (a writing frequency (1000 times/week, for example)).

As mentioned above, the substitution manager 26 moves information recorded in adjacent tracks neighboring an extracted high-writing-frequency track to the substitution area Zr by the write controller 21 and the read controller 22 similarly to the above.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. A magnetic disk control device, comprising:
a write controller to control, in a magnetic disk having tracks, the each track being a storage area made by concentrically dividing a magnetic recording layer formed onto a disk into a plurality of areas, the each track being further divided into a plurality of areas in a rotative direction as sectors, writing information into the each sector; and
a substitution controller to make, by detecting the sector or the track written at a frequency higher than a prescribed writing frequency based on a number of times of writing by the write controller to the sector or the track per prescribed unit time and by moving information recorded in an adjacent track adjacent to a high-writing-frequency track including the detected high writing frequency sector or to a high-writing-frequency track which is detected as a high writing frequency track to a track of a substitution area set in advance, the adjacent track be in an idle status, the idle status being a status of not being used.

2. The magnetic disk control device according to claim 1, wherein
the substitution controller moves information recorded in the high-writing-frequency track to a track of the substitution area during a low access state where write requests or read requests from outside are reduced.

3. The magnetic disk control device according to claim 1, wherein,
when the high-writing-frequency track is detected newly in a situation where all of a plurality of tracks in the substitution area are in use as a track related to the adjacent track, the substitution controller returns information recorded in a track selected from the substitution area to the original adjacent track and moves information recorded in an adjacent track adjacent to the newly detected high-writing-frequency track to the track of the substitution area which became to an idle status.

4. The magnetic disk control device according to claim 1, wherein,
when detecting a writing frequency of a track detected as a high-writing-frequency track declining to a frequency less than a prescribed threshold value, the substitution controller returns information to be recorded in the adjacent track adjacent to the high-writing-frequency track to an original adjacent track from a track of the substitution area.

5. A magnetic disk apparatus, comprising:
a magnetic disk having tracks, the each track being a storage area made by concentrically dividing a magnetic recording layer formed onto a disk into a plurality of areas, the each track being further divided into a plurality of areas in a rotative direction as sectors; and
a magnetic disk control device that includes a write controller to control writing information into the each sector in the magnetic disk and a substitution controller to make, by detecting the sector or the track written at a frequency higher than a prescribed writing frequency based on a number of times of writing by the write controller to the sector or the track per prescribed unit time and by moving information recorded in an adjacent track adjacent to a high-writing-frequency track including the detected high writing frequency sector or to a high-writing-frequency track which is detected as a high writing frequency track to a track of a substitution area set in advance, the adjacent track be in an idle status, the idle status being a status of not being used.

6. The magnetic disk apparatus according to claim 5, wherein
the substitution controller moves information recorded in the high-writing-frequency track to a track of the substitution area during a low access state where write requests or read requests from outside are reduced.

7. The magnetic disk apparatus according to claim 5, wherein,
when the high-writing-frequency track is detected newly in a situation where all of a plurality of tracks in the substitution area are in use as a track related to the adjacent track, the substitution controller returns information recorded in a track selected from the substitution area to the original adjacent track and moves information recorded in an adjacent track adjacent to the newly detected high-writing-frequency track to the track of the substitution area having become an idle status.

8. The magnetic disk apparatus according to claim 5, wherein,
when detecting a writing frequency to a track which is detected as a high-writing-frequency track declining to a frequency less than a prescribed threshold value, the substitution controller returns information which is recorded in the adjacent track adjacent to the high-writing-frequency track to an original adjacent track from a track of the substitution area.

9. A magnetic disk control method, comprising:
  detecting, in a magnetic disk having tracks, the each track being a storage area made by concentrically dividing a magnetic recording layer formed onto a disk into a plurality of areas, the each track being further divided into a plurality of areas in a rotative direction as sectors, the sector or the track written at a frequency higher than a prescribed writing frequency based on a number of times of writing by the write controller to the sector or the track per prescribed unit time; and
  moving information recorded in an adjacent track adjacent to a high-writing-frequency track including the detected high writing frequency sector or a high-writing-frequency track which is detected as a high writing frequency track to a track of a substitution area set in advance, making the adjacent track be in an idle status, the idle status being a status of not being used.

10. The magnetic disk control method according to claim 9, wherein,
  on occasion when the move is performed, the substitution controller moves information recorded in the high-writing-frequency track to a track of the substitution area during a low access state where write requests or read requests from outside are reduced.

11. The magnetic disk control method according to claim 9, wherein,
  on occasion when the move is performed, when the high-writing-frequency track is detected newly in a situation where all of a plurality of tracks in the substitution area are in use as a track related to the adjacent track, the substitution controller returns information recorded in a track selected from the substitution area to the original adjacent track and moves information recorded in an adjacent track adjacent to the newly detected high-writing-frequency track to the track of the substitution area having become an idle status.

12. The magnetic disk control method according to claim 9, wherein,
  when detecting, after performing the move, a writing frequency to a track which is detected as a high-writing-frequency track declining to a frequency less than a prescribed threshold value, the substitution controller returns information which is recorded in the adjacent track adjacent to the high-writing-frequency track to an original adjacent track from a track of the substitution area.

* * * * *